United States Patent [19]
Bottomley et al.

[11] Patent Number: 5,909,465
[45] Date of Patent: Jun. 1, 1999

[54] METHOD AND APPARATUS FOR BIDIRECTIONAL DEMODULATION OF DIGITALLY MODULATED SIGNALS

[75] Inventors: Gregory Edward Bottomley, Cary, N.C.; Paul Wilkinson Dent, Stehag, Sweden; Ravinder David Koilpillai; Sandeep Chennakeshu, both of Cary, N.C.

[73] Assignee: Ericsson Inc., Research Triangle Park, N.C.

[21] Appl. No.: 08/761,003

[22] Filed: Dec. 5, 1996

[51] Int. Cl.⁶ .............................. H04Q 1/20; H04B 17/00
[52] U.S. Cl. .................... 375/227; 375/340; 375/346; 370/333; 455/135
[58] Field of Search ................... 375/227, 260, 375/267, 340, 341, 347, 349, 231, 285, 346, 348; 370/332, 333; 455/132–135

[56] References Cited

U.S. PATENT DOCUMENTS

| | | | |
|---|---|---|---|
| 5,182,753 | 1/1993 | Dahlin et al. | 371/33 |
| 5,239,557 | 8/1993 | Dent | 370/342 |
| 5,263,026 | 11/1993 | Parr et al. | 370/350 |
| 5,274,670 | 12/1993 | Serizawa et al. | 375/231 |
| 5,331,666 | 7/1994 | Dent | 375/341 |
| 5,335,250 | 8/1994 | Dent et al. | 375/224 |
| 5,375,123 | 12/1994 | Anderson et al. | 370/333 |
| 5,400,362 | 3/1995 | Chennakeshu et al. | 375/285 |
| 5,432,821 | 7/1995 | Polydorod et al. | 375/340 |
| 5,455,844 | 10/1995 | Ishikawa et al. | 375/232 |
| 5,479,450 | 12/1995 | Okanoue et al. | 375/340 |
| 5,553,102 | 9/1996 | Jasper et al. | 375/347 |
| 5,633,860 | 5/1997 | Hagmanns | 370/252 |

FOREIGN PATENT DOCUMENTS

| | | | |
|---|---|---|---|
| 0448069 | 9/1991 | European Pat. Off. | H04L 1/06 |
| 0582346 | 2/1994 | European Pat. Off. | H04L 25/30 |
| 0594551 | 4/1994 | European Pat. Off. | H04L 25/30 |
| 0648032 | 4/1995 | European Pat. Off. | H04L 1/20 |
| 4311604 | 7/1994 | Germany | H04L 1/20 |

*Primary Examiner*—Young T. Tse
*Attorney, Agent, or Firm*—Jenkens & Gilchrist, P.C.

[57] ABSTRACT

A system and method for bidirectionally demodulating data symbols transmitted through a communication channel. The method includes sequentially receiving and storing a first plurality of known data symbols, a second plurality of unknown data symbols, and a third plurality of known data symbols. Thereafter, a first block of the unknown data symbols received nearer the first plurality of known data symbols is forward-demodulated. Likewise, a second block of the unknown data symbols received nearer the third plurality of known data symbols is backward-demodulated. The forward- and backward-demodulation of the unknown data symbols determines quality values (figure-of-merits based on at least one of signal power, noise power and a combination of signal power plus noise power) indicative of demodulation qualities of the unknown data symbols that are compared to produce a best direction indication. Upon determining the best direction indication, either the forward- or backward-demodulation steps are repeated for subsequent blocks of unknown data symbols.

14 Claims, 5 Drawing Sheets

METHOD AND APPARATUS FOR BIDIRECTIONAL DEMODULATION OF DIGITALLY MODULATED SIGNALS

BACKGROUND OF THE INVENTION

1. Field of the Invention

The present invention relates to the demodulation of digitally modulated signals and more particularly, to such signals received through radio channels subjected to the interference phenomenon such as fading, distortion and intersymbol interference.

2. History of the Related Art

In the communication of digitally modulated radio signals such as are employed in mobile radio telephone systems, the quality of the signal received by a mobile station from a base station is affected from time to time by natural phenomena inherent in the use of radio signals to communicates. A factor common to most of the problems related to radio reception is that a desired signal at the receiver is too weak, either in comparison to thermal noise or in comparison to an interfering signal. The interfering signal can be characterized as any undesired signal received on the same channel by the receiver as the desired signal. Another common transmission problem in mobile radio systems used in an environment where there are objects such as buildings present, is that of log-normal fading. This phenomenon occurs as a result of a shadowing effect produced by buildings and natural obstacles such as hills located between the transmitting and receiving antennas of the mobile station and the base station. As the mobile station moves around within the environment, the received signal strength increases and decreases as a function of the type of obstacles which are at that moment between the transmitting and receiving antennas.

Another phenomenon which effects signal strength within the mobile radio system operated in an urban environment is that of Rayleigh fading. This type of signal degradation occurs when a broadcast signal takes more than one path from the transmitting antenna to the receiving antenna so that the receiving antenna of the mobile station receives not just one signal but several. One of these multiple signals may come directly from the transmitting antenna but several others are first reflected from buildings and other obstructions before reaching the receiving antenna and, thus, are delayed slightly in phase from one another. The reception of several versions of the same signal shifted in phase from one another results in a vector sum of the signals being the resultant composite signal actually received at the receiving antenna. In some cases, the vector sum of the received signal may be very low, even close to zero, resulting in a fading dip wherein the received signal virtually disappears. In the cases of a moving mobile station, the time that elapses between two successive fading dips due to Rayleigh fading depends on both a frequency of the received signal and a speed at which the mobile station is moving.

In case of digitally modulated radio systems, such as those in which time division multiple access (TDMA) is used, other radio transmission difficulties arise. One of these difficulties, referred to as time dispersion, occurs when a signal representing certain digital information is interfered with at the receiving antenna by different, consecutively transmitted symbols due to reflections of the original signal from an object far away from the receiving antenna. It thus becomes difficult for the receiver to decide which actual symbol is being detected at the present moment. Another transmission phenomenon inherent in the use of digitally modulated signals, such as TDMA, is due to the fact that each mobile station must only transmit during a particular allocated time slot of the TDMA frame and remain silent during the other times. Otherwise, the mobile will interfere with calls from other mobile stations which are assigned different time slots of the same frame.

One technique used to deal with the time dispersion of digitally modulated signals and the resultant inter-symbol interference is equalization within the receiver. Since an optimum receiver is adapted to the particular type of channel used for the transmission, equalization creates a mathematical model of the channel and adjusts the receiver to this model. If the receiver knows how long and how strong the signal reflections are, it can take this into account when the received signal burst is detected. In the mobile radio environment, an equalizer creates a model of the transmission channel, eg. the air interface, and calculates the most probable transmitted sequence of data within that channel. For example, TDMA digitally modulated data is transmitted in bursts which are placed within discrete time slots. A "training sequence" comprising data of a known pattern and with good auto-correlation properties is placed somewhere in each burst. This training sequence is used by the equalizer to create the channel model. The channel model may change with time, so that it may be tracked during each burst.

The training procedure within the equalizer may also involve correlating the received signal burst with one or more shifts of the training pattern to determine a corresponding number of points (both phase and amplitude) of the channel's impulse response.

An MLSE equalizer typically implements a linear, finite-impulse-response (FIR) model of the channel, that is, a transversal filter or a tapped delay line having complex multiplication weights applied to the tap outputs. The weighted outputs are summed to predict, for each possible data symbol pattern that can be contained within the time span of the channel's impulse response, the signal waveform that should be received for the next data symbol. The predicted waveforms are compared with the actually received waveform and metrics for and against the probability of each data symbol pattern being "correct" (i.e., the pattern received) are accumulated. Each metric is based on the accuracy of the match between the predicted waveform and the received waveform. The data symbol patterns that can be contained within the time span of the channel's impulse response correspond to the "states" of the system. Such equalizers are sometimes referred to as "Viterbi" equalizers and are described in J. G. Proakis, *Digital Communication*, 2d ed, New York,: McGraw-Hill, Sections 6.3 and 6.7 (1989).

The weights applied to the delay line tap outputs are the J coefficients, $C_1, C_2, C_3 \ldots C_j$ in the equation:

$$S_i = c_1 D_i + c_2 D_{i-1} + c_3 D_{i-2} \ldots C_j D_{i-j+1};$$

where $S_i$ is the predicted signal for the sequence of data symbol patterns $D_i, D_{i-1}, D_{i-2} \ldots$ The coefficients are usually calculated from the known training pattern. In the case of signaling by binary data symbols, (i.e., 1 and 0), the number of predicted signals that must be calculated is $2^j$. It is understood that M'ary (e.g. quaternary) data symbols can also be used.

Various methods for optimally updating the channel model from the received signal are known, such as that described in European patent application no. 90850301.4, filed Sep. 10, 1990. The best methods maintain a separate channel model for each Viterbi state and, when one of the states is selected as the best predecessor of a new state, the channel model corresponding to that state is updated and becomes the channel model for the new state. Thus, it is ensured that the channel models are always derived from the best demodulated data sequences received up to that time.

U.S. Pat. No. 5,331,666 to Dent entitled "Adapted Maximum Likelihood Modulator" describes a variation of the adaptive Viterbi equalizer that does not employ channel models to generate the predictions except during system start-up, and thus does not update the channel model parameters Rather, direct updating of the signals predictions for each state, without going through the intermediate step of first updating the channel models is described in the Dent '666 patent which is hereby incorporated by reference herein.

Viterbi equalizers incorporate the following steps in performing their functions: (1) determining the tap coefficients of a Finite Impulse Response (FIR) model of the channel; (2) for all possible data symbol sequences that can be postulated to be contained within the impulse response length of the channel model, predicting the signal value that should be received based upon the determined tap coefficients; (3) comparing each postulated value with the actually received signal value and calculating the mismatch (usually by squaring the difference between the received and postulated values); (4) for each postulated symbol sequence, adding the calculated mismatch to the cumulative mismatch of predecessor sequences that are consistent with the postulated symbol sequence, also called "the state" (the cumulative mismatch values are called "path metrics"); and (5) choosing the "best" of the possible predecessor sequences that can transition to the new postulated state, i.e., choosing the predecessor sequence that gives the lowest path metric for the new state. Thus, the path metrics can be considered confidence factors that represent the degrees of correlation between the postulated symbol sequences and the actually received signal.

It should be appreciated that the Viterbi equalizer is a form of sequential maximum likelihood sequence estimator (MLSE) that decodes, or demodulates, the received data symbol stream. MLSE estimators and other equalization methods are described in the reference by J. G. Proakis, above.

Figure 1:
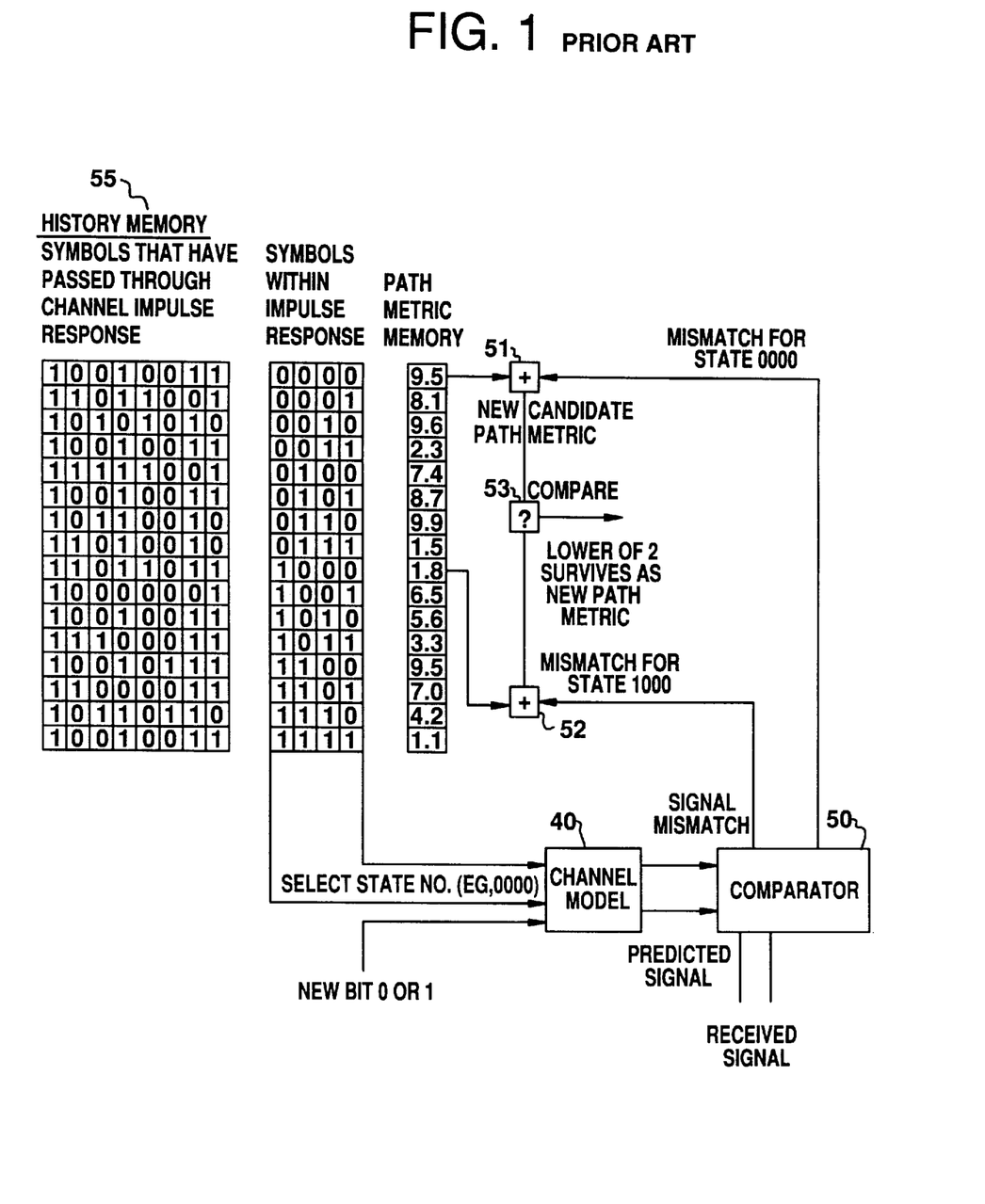
FIG. 1 is a diagrammatic representation of a maximum likelihood algorithm that can be used to implement a demodulator.

FIG. 1 illustrates the data structure and flow within an MLSE equalizer having 16 states, the predicted signal values being assumed to depend on four previous binary symbols (bits) plus one new bit. The channel impulse response length (J) for this example is thus five symbols, i.e., the latest echo can be four symbols delayed compared to the shortest signal path.

Referring to FIG. 1, an MLSE processing cycle begins by assuming the postulated symbol history of state 0000 to be true, and that a new bit "0" was transmitted. Consequently, causing the channel model 40, the signal value that should be observed given the 5-bit symbol history 00000 predicted. This is compared in comparator 50 with the actual received signal value and a mismatched value produced. This is added in adder 51 with the previous state 0000 path metric to produce a candidate metric for a new 0000 state.

However, another candidate for the new path metric of new state 0000 can be derived by assuming state 1000 to contain the true history, with a new bit of '0'. This is because both 0000-0 and 1000-0 lead to a new state (0-0000) when the oldest (left-most) bit is left shifted out of the 4-bit state number and into the symbol history memory. This candidate is evaluated by applying 10000 to the channel model 40, comparing the prediction so-obtained with the input signal value in comparator 50 and adding the resultant mismatch with the previous cumulative mismatch (path metric) associated with state 1000 in adder 52. The two candidate values from adders 51 and 52 are then compared in a comparator 53, and the lower of the two is selected to become the new path metric of new state 0000. Furthermore, the contents of the history memory 55 associated with the selected predecessor state is selected to be the symbol history of the new state 0000. Also, the selected bit history is left-shifted and a 0 or 1 entered in the right-most position according as state 0000 or 1000 gave rise to the selected candidate path metric.

The above procedure is then repeated with the assumption that the new bit is a '1' in order to produce a new state 0001, also with either state 0000 or 1000 as candidate predecessors The above procedure is then repeated using every pair of states, which are 8 states apart, to derive all 16 new states, as follows:

0001,1001 to produce new states 0010 and 0011
0010,1010 to produce new states 0100 and 0101
0011,1011 to produce new states 0110 and 0111
0100,1100 to produce new states 1000 and 1001
0101,1101 to produce new states 1010 and 1011
0110,1110 to produce new states 1100 and 1101
0111,1111 to produce new states 1110 and 1111

At the end of the above processing cycle, one signal sample has been processed and one extra bit has been demodulated and inserted into symbol history memories 55. There is a tendency for the older bits in the history memories to converge to the same value, at which point that bit can be extracted as a final unambiguous decision and the history memory shortened 1 bit. Other methods of truncating history memory growth are known to the art, such as taking the oldest bit from the state having the lowest path metric. If memory is sufficient, bits need not be extracted until all received values have been processed.

It will be understood that the MLSE equalizer recognizes that some sequences of data symbol patterns, and thus some sequences of predicted waveforms, are not valid. For example, a prediction that the channel carried the binary data symbol pattern 10010 at one instant (i.e, one bit period) and a prediction that the channel carried the binary data symbol pattern 11001 at the next instant (i.e., the next bit period) are inconsistent because the pattern 10010 can be followed only by the patterns 00100 or 00101 (assuming a left-shift in passing through the channel.) Also under such conditions, each of the 00100 and 00101 patterns can have only either 10010 or 00010 as predecessors. Thus, a set of transition rules constrains the number of ways the metrics can be sequentially accumulated for each sequence of predicted waveforms.

It will be appreciated that such prior demodulators operate on the received signal only in the forward direction: a received training pattern is used to develop predicted waveforms for yet-to-be-received data symbols. If the training pattern is lost or excessively distorted due to severe channel fading, intersymbol interference, frequency errors, etc., such forward demodulators must wait until the next training pattern is successfully received before they are able to demodulate accurately. As a result, data sent in the intervening periods between training patterns can be lost.

In U.S. Pat. No. 5,335,250 to Dent et al. entitled "Method and Apparatus for Bidirectional Demodulation of Digitally Modulated Signals" a technique is disclosed and claimed for minimizing the loss of data sent during intervening periods between training patterns. This technique includes the demodulation of intervening data not only forward from a received training pattern but also backwards from the next received training pattern. In general, this technique is implemented by storing a sequence of received signal samples, time-reversing the stored sequence, and estimating quality factors for both forward and backward demodulation of the stored and time reversed sequence, respectively, to determine how many data symbols should be decoded by forward demodulation and how many should be decoded by backward demodulation.

In the technique set forth in the '250 patent, the criterion decide which direction to continue demodulation from the training pattern is based upon the metric in the MLSE equalizers which is typically related to the noise level within the received data. Since the demodulated she demodulated signal depends not only upon the level of noise but also the signal strength, a technique for determining which direction to demodulate from the training pattern which considers other parameters related to both signal strength and noise results in a better performance. The system of the present invention incorporates such a technique.

SUMMARY OF THE INVENTION

The present invention provides a method and apparatus for enhancing the performance of bidirectional digital modulation of digitally modulated signals by processing blocks of symbols and deciding which direction to continue demodulation based upon a figure of merit (FOM) associated with the processed block of symbols which can be obtained from parameters other than the equalizer metrics. Among the parameters used by the system of the present invention are: an estimation of signal strength, which can be obtained from the predicted received values; a ratio of signal strength to noise; an estimation of received signal strength (signal plus noise power) which can be obtained from the received data; and a parameter obtained by taking the ratio of received signal plus noise power divided by noise.

In one aspect, the present invention bidirectionally demodulates data symbols transmitted through a communication channel by sequentially receiving a plurality of first signal samples corresponding to predetermined data symbols, a second plurality of signal samples corresponding to unknown data symbols, and a third plurality of signal samples corresponding to a set of second predetermined data symbols. The received pluralities of data samples are stored and first and second sets of reference signals are determined from the stored pluralities of first and third signal samples, respectively. A block of the unknown data symbols having a preselected number of symbols therein is forward-demodulated using the first set of reference signals beginning with signal samples received nearer the first plurality of signal samples. A block of the unknown data symbols having the preselected number of symbols therein is also backward-demodulated using the second set of reference signals beginning with signal samples received nearer the third plurality of signal samples. Quality values indicative of demodulation qualities in the respective forward- and backward-demodulated blocks of data symbols are determined and compared with one another. Either the forward- or backward-demodulated data symbols are selected for output as demodulated data based upon the higher of the compared quality values. Additional blocks of data symbols are processed sequentially until the entire plurality of signal samples have been demodulated.

In a further aspect, the system of the invention demodulates data symbols transmitted through a communication channel by determining quality values indicative of demodulation qualities using a figure-of-merit based upon various parameters which include signal estimation ($S_{est}$) obtained from the predicted received values.

BRIEF DESCRIPTION OF THE DRAWINGS

A more complete understanding of the method and system of the present invention may be obtained by reference to the following Detailed Description of the preferred embodiment (s) that follow, taken in conjunction with the accompanying drawings, wherein.

DESCRIPTION OF THE PREFERRED EMBODIMENT

Figure 2A:
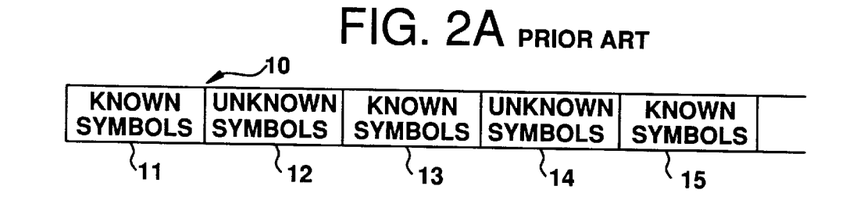
FIG. 2A shows a diagram illustrating the format of a portion of a signal for processing in accordance with the present invention.

FIG. 2A shows the format of a portion 10 of a data-modulated signal that may be processed by a method and apparatus in accordance with the present invention. The portion 10 comprises: a plurality of first predetermined data symbols 11, which are known beforehand to a receiver and precede a first plurality of unknown data symbols 12; a plurality of second predetermined data symbols 13, which are known before hand to the receiver and precede a second plurality of unknown data symbols 14; and a plurality of third predetermined data symbols 15, which are known before hand to the receiver. It should be understood that the portion 10 is only a small part of a communication signal that is used for illustrative purposes. In a time-multiplexed communications system, the data symbols 12 can be intended for reception by a first receiver that uses the data symbols 11 as its equalizer training pattern, and the data symbols 14 can be intended for a second receiver that uses the data symbols 13 as its equalizer training pattern. The first and second receivers can be two separate receivers receiving a TDMA radio signal in separate slots of the same frame.

In accordance with bidirectional demodulation techniques, the pluralities 11, 13 of first and second predetermined symbols, are used by one receiver to improve demodulation of the intervening plurality of unknown data symbols 12. Also the plurality 13, of second predetermined data symbols, can be used by another receiver in conjunction with the later plurality of third predetermined data symbols 15 to demodulate the intervening plurality of unknown data symbols 14. It can be seen that the pluralities of first and second predetermined symbols may be identical to the plurality of third predetermined symbols and that patterns of predetermined data symbols may be interspersed among the unknown data symbols 12 in order to better demodulate the unknown symbols.

An apparatus in accordance with the present invention preferably employs one of the MLSE equalizers such as those described above. For a Viterbi demodulator, as set forth in the '250 patent, the path metric serves as the measure of the cumulative quality of the symbols already decoded.

Figure 3:
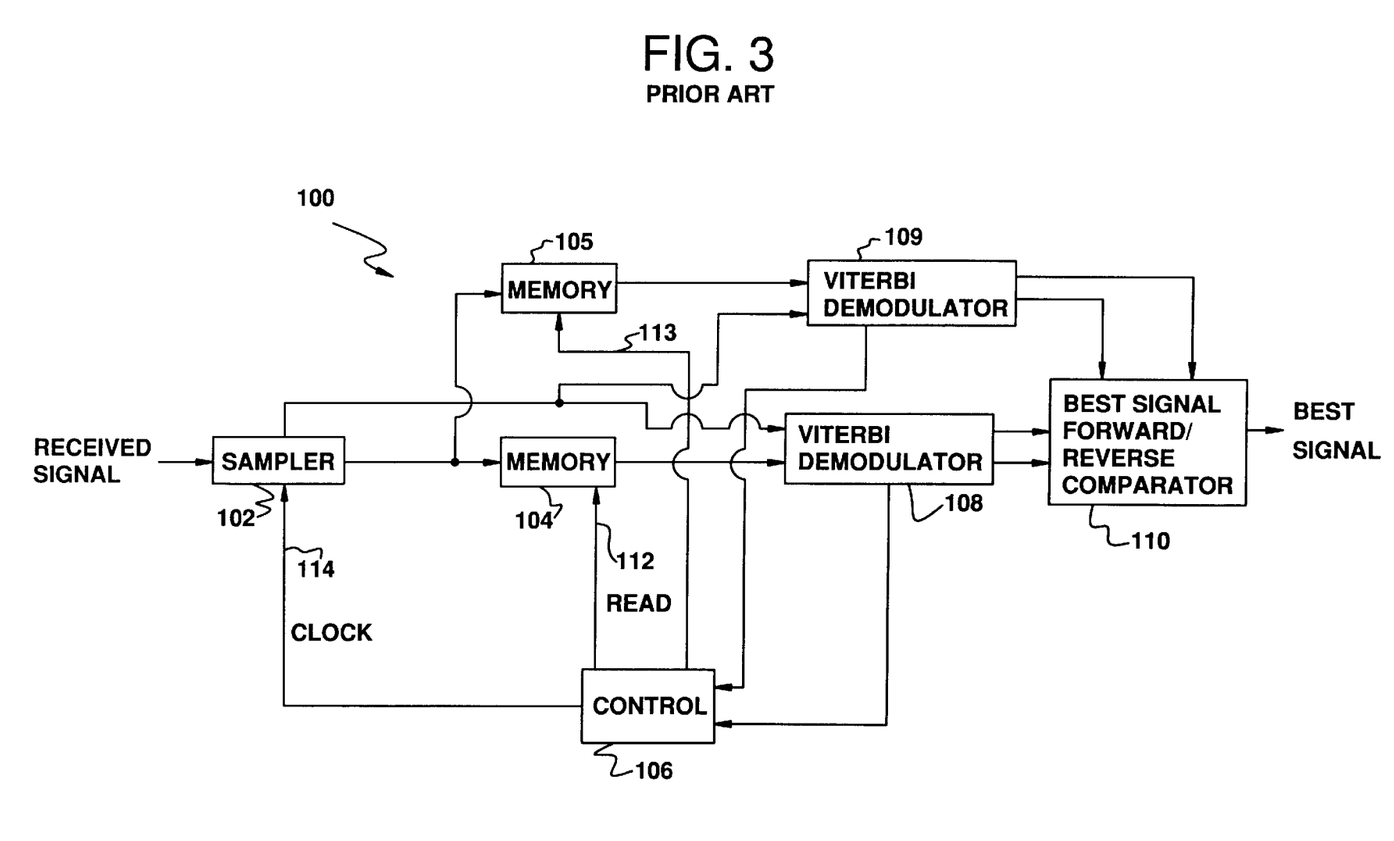
FIG. 3 is a block diagram of a system for demodulating transmitted data symbols in both the forward and backward directions.

Referring next to FIG. 3, an apparatus 100 for bidirectional demodulation of transmitted data symbols in accordance with the '250 patent comprises a received signal sampler 102 that digitizes the received signal after suitable conditioning. The signal sample values are then stored in a suitable memory 104. The signal samples are recalled from the memory 104 in response to control signals generated by controller 106, and presented to a Viterbi demodulator 108. The controller 106 may also generate appropriately timed signals for triggering the signal sampler 102.

The stored signal samples are first recalled from the memory 104 in normal time order, namely, the predetermined data symbols 11 followed by the unknown data symbols 12. As described above, the Viterbi demodulator 108 uses the known symbols 11 to initialize the Viterbi demodulator using some of the received signal sample values. Then, the Viterbi demodulator demodulates symbols 12 using some of the received signal sample values.

The controller 106 then recalls the received signal samples from the memory 104 in reverse time order, namely, predetermined symbols 13 (reversed), followed by the unknown data symbols 12 (reversed), and the backwards signal samples are presented to the Viterbi demodulator 109. The Viterbi demodulator 109 processes the backwards signal samples in the same way that the forward signal samples were processed. Thus, the time-reversed sequence of predetermined symbols 13 is used to predict the signal sample values expected for each possible time-reversed sequence of the unknown data symbols 12, and the prediction giving the best match (lowest cumulative path metric) is determined.

The comparator 110 compares the best-matched path metrics of the forward and backward demodulations, and the predicted data symbol sequence corresponding to the lower best-matched path metric is selected as the demodulation of the unknown data symbol pattern 12. It will be appreciated that the operations described herein can be conveniently carried out by means of a signal processor consisting of a random access memory for holding signal samples and the results of intermediate calculations, an arithmetic and logic unit (ALU) capable of performing the operations of ADD, SUBTRACT, and MULTIPLY, and a program memory holding a list of instructions for the ALU together with a controller that can transfer execution of instructions from one place to another within the list depending upon the result of an arithmetic operation such as SUBTRACT, which can be used to perform magnitude comparisons. A suitable signal processor is, for example, the model TMS 320C50 digital signal processor manufactured by Texas Instruments By the use of a second predetermined symbol sequence, or training pattern, as described above, bidirectional demodulation is advantageously robust against losses of the predetermined symbol sequences (e.g., losses due to channel fading). For example, a deep fade occurring nearer one of the predetermined signal sequences can induce errors in a conventional demodulator in which the channel model is updated based upon the received signal (i.e., the equalizer is adaptive). In contrast, the present demodulator would be unaffected: if the fade occurs nearer the training pattern 11 than training pattern 13, then the reverse demodulation would succeed for a longer sequence of data symbols than the forward demodulation (producing a lower cumulative path metric for the reverse demodulation), and would be selected by the processor 110. Thus, the illustrative bidirectional demodulator selects that demodulation direction giving the greater run-length of successively demodulated symbols.

This desirable tendency is encouraged in another technique useful with the circuitry of FIG. 3, in which two partial path metrics are determined by forward-demodulating half of the received unknown data symbols 12 and backward-demodulating the other half. Each of the best-matched path metrics determined by forward- and backward-demodulating all the symbols 12 is then compared with the sum of the two partial path metrics, and the predicted data symbol sequence corresponding to the best of the three path metrics is selected and output as the demodulation of the unknown data symbol pattern. The foregoing requires a negligible amount of additional processing, but gives additional robustness against a deep fade occurring near the center of the unknown data symbol sequence.

As pointed out above, the method and system of the present invention recognizes that signal quality information can include not just metric growth $\hat{N}$, but also signal strength $\hat{S}$ or signal plus noise $\hat{S}+\hat{N}$ as well as certain ratios of those parameters to the noise. In addition, the system of the present invention controls the direction of forward or backward demodulation based upon groups of symbol periods rather than a single symbol as in the prior art '250 patent.

Figure 4A:
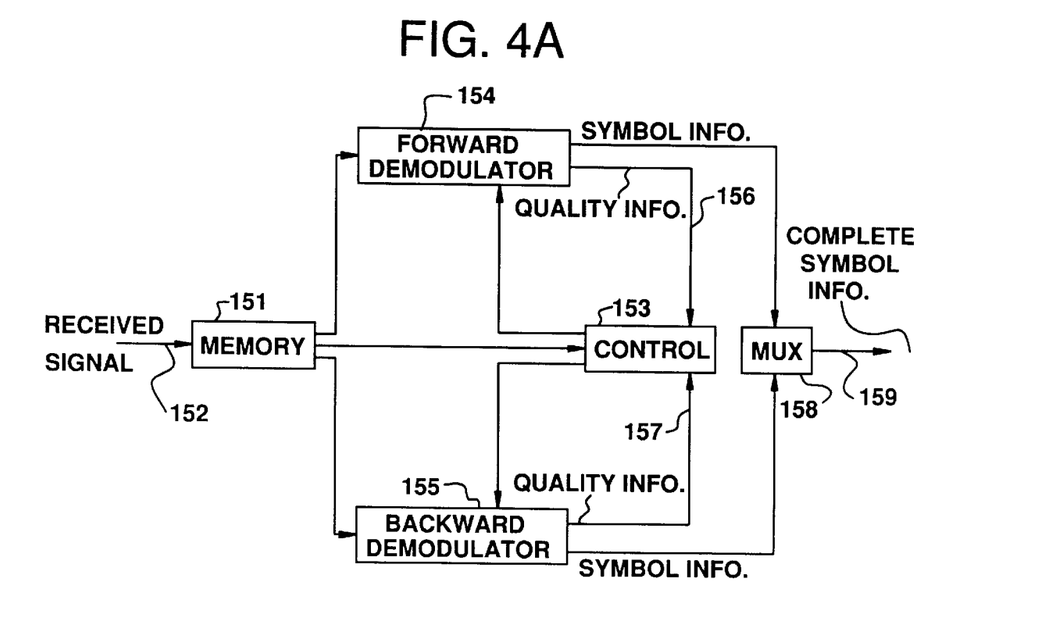
FIG. 4A is a block diagram of a system for determining the optimum direction for demodulation of transmitted data symbols in accordance with the system of the present invention.

Referring next to FIG. 4A, there is shown a block diagram of a system constructed in accordance with the principles of the present invention. A memory 151 receives the data samples to be demodulated 152 and stores them as signal sample values. The signal samples are recalled from the memory 151 in response to control signals generated by a controller 153 and presented to both a forward demodulator 154 and a backward demodulator 155. Demodulation quality information is coupled from the forward demodulator 154 to the controller 153 via line 156 while quality information is connected from the backward demodulator 155 to the controller 153 via line 157. Output symbol information from both the forward demodulator 154 and the backward demodulator 155 are connected to a multiplexer 158 the output of which comprises complete symbol information 159.

The processing circuitry of FIG. 4A processes blocks of symbols, for example, 12 at a time, which are extracted from memory 151 and then decides which direction to continue demodulation based upon a block figure-of-merit (FOM). The figure-of-merit can include a number of different possible criteria, including (1) $N_{est}$ (noise value), which can be obtained from metric growth as employed in the prior art '250 patent; (2) $S_{est}$ (signal value), which can be obtained from the predicted received values; (3) $S_{est}/N_{est}$ (ratio of the signal to noise); (4) $(S+N)_{est}$ (which can be obtained from the received data); and (5) $(S+N)_{est}/N_{est}$. Various criteria can be used to select which of the FOM are employed to make the direction decision; for example, if $(S+N)_{est}$ are used, the point where the two modulation direction would meet can be precomputed. Additional FOM are also possibly used, for example, an alternative of $S_{est}$ would be the channel gain, taken from the channel tap estimates of the demodulator.

In addition, the present invention can be implemented with a cost function approach which might include the following: (1) signal and/or noise power estimation, as described above; (2) sync quality information; (3) distance from sync word, accounting for tracking uncertainty; and/or (4) fade depth information or relative signal and/or noise information. The cost function may be expressed either algebraically or by means of a set of rules.

Referring again to FIG. 4A, two blocks of samples are extracted from memory 151, one being forward demodulated in demodulator 154 and one being backward demodulated in demodulator 155 and then quality information based upon a preselected figure-of-merit (FOM) is sent via lines 156 and 157 to the controller circuit 153. The two sets of quality information are compared to one another and a decision reached in the control block 153 with respect to which direction of demodulation is providing the higher quality results. Thereafter, the system demodulates a second block of data in the direction that produced the better results and compares the quality of that demodulation with the prior result of the other direction and decides whether to continue in the same direction or change direction for the next block of symbols to be demodulated. As symbol information is produced by each of the forward demodulator 154 and backward demodulator 155, it is output to the multiplexer 158 which sends complete symbol information 159 to the remaining circuitry of the receiver. Control unit 153 compares a forward block FOM with a backward block FOM. If the forward block FOM is better, then the next forward block is demodulated. Otherwise, the next backward block is demodulated.

Figure 4B:
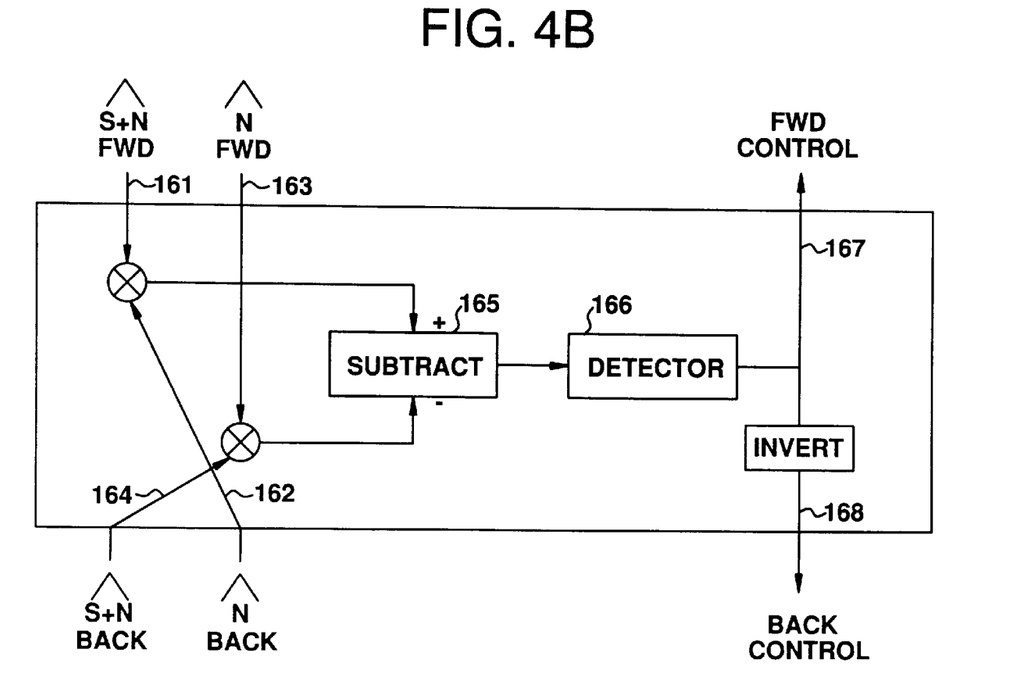
FIG. 4B is an illustrative diagram of the control logic for determining the optimum direction of modulation for the system of FIG. 4A in accordance with the system of the present invention.

Referring to FIG. 4B, there is shown a functional diagram illustrating an illustrative operation of the control circuit 153 in FIG. 4A. The logic circuit of 4B implements the following logical algorithms:

Fwd Control=det $\{(S \hat{+} N \text{ Fwd}) (\hat{N}\text{Back})-(S \hat{+} N \text{ Back}) (\hat{N}\text{Fwd})\}$ Back Control=Opposite of Fwd Control where det produces a "1" or "on" if the input is positive.

As can be seen in FIG. 4B, the signal plus noise in the forward direction over line 161 is multiplied times the noise in the backward direction over line 162 while the noise in the forward direction over line 163 is multiplied times the signal plus noise in the backward direction over line 164. The difference between the respective products is taken in a subtract operation 165 and passed through a detector 166 which applies a forward control signal on line 167 and a back control signal on 168 as appropriate.

It can also be seen that another algorithm such as the following could also be implemented by logical control circuitry:

$$\frac{S + N_F}{N_F} \rangle \frac{S + N_B}{N_B}$$

Yes ⇒ Fwd

No ⇒ Back

Figure 5:
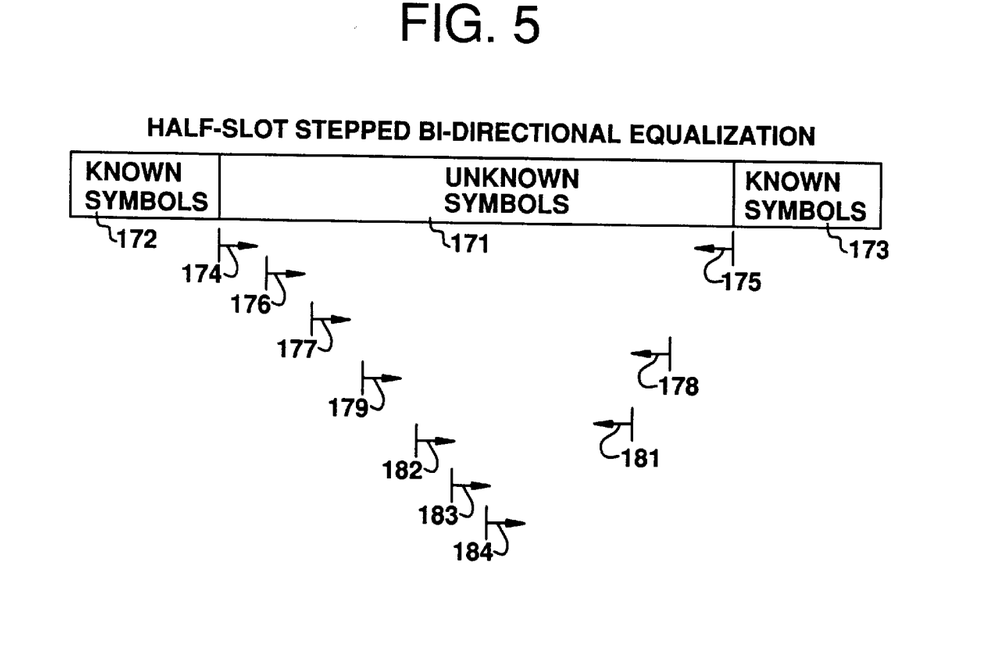
FIG. 5 is a diagrammatic illustration of stepped bidirectional equalization in accordance with the system of the present inventions.

Referring briefly to FIG. 5, there is diagrammatically illustrated the stepped bidirectional equalization performed in one aspect of the present invention. A sequence of unknown symbols 171 is located between two blocks of known symbols 172 and 173. The unknown symbols 171 are bidirectionally demodulated by demodulating a first block of symbols in the forward direction at 174 and a second block of symbols in the backward direction at 175. Based upon an analysis of the results of demodulation in both directions, the better direction (forward in this example) is selected and forward modulation continues at 176 and 177. 178 represents demodulation in the backward direction in response to that direction providing the better results. Resumption of demodulation in the forward direction at 179 is followed by additional demodulation in the backward direction at 181. Demodulation of the entire unknown block of symbols 171 is completed by three successive forward demodulations 182, 183 and 184. Thus, it can be seen how changing the direction of demodulation for successive blocks of symbols functions where better results are obtained from demodulating one direction over another and produces a higher quality output signal closer to the originally transmitted data.

It should be noted that the present invention can be used when the block length is the same as the length of the unknown symbols. In this case, the single block is demodulated both forward and backward. It may be advantageous for the first forward block to be a block of symbols in known symbols 11. In this case, the symbol values are known, which can be used to constrain the demodulator to the correct detected symbol values. A FOM for this block can still be calculated and used as already described. A similar approach can be used in the backward direction with known symbols 13.

Figure 6:
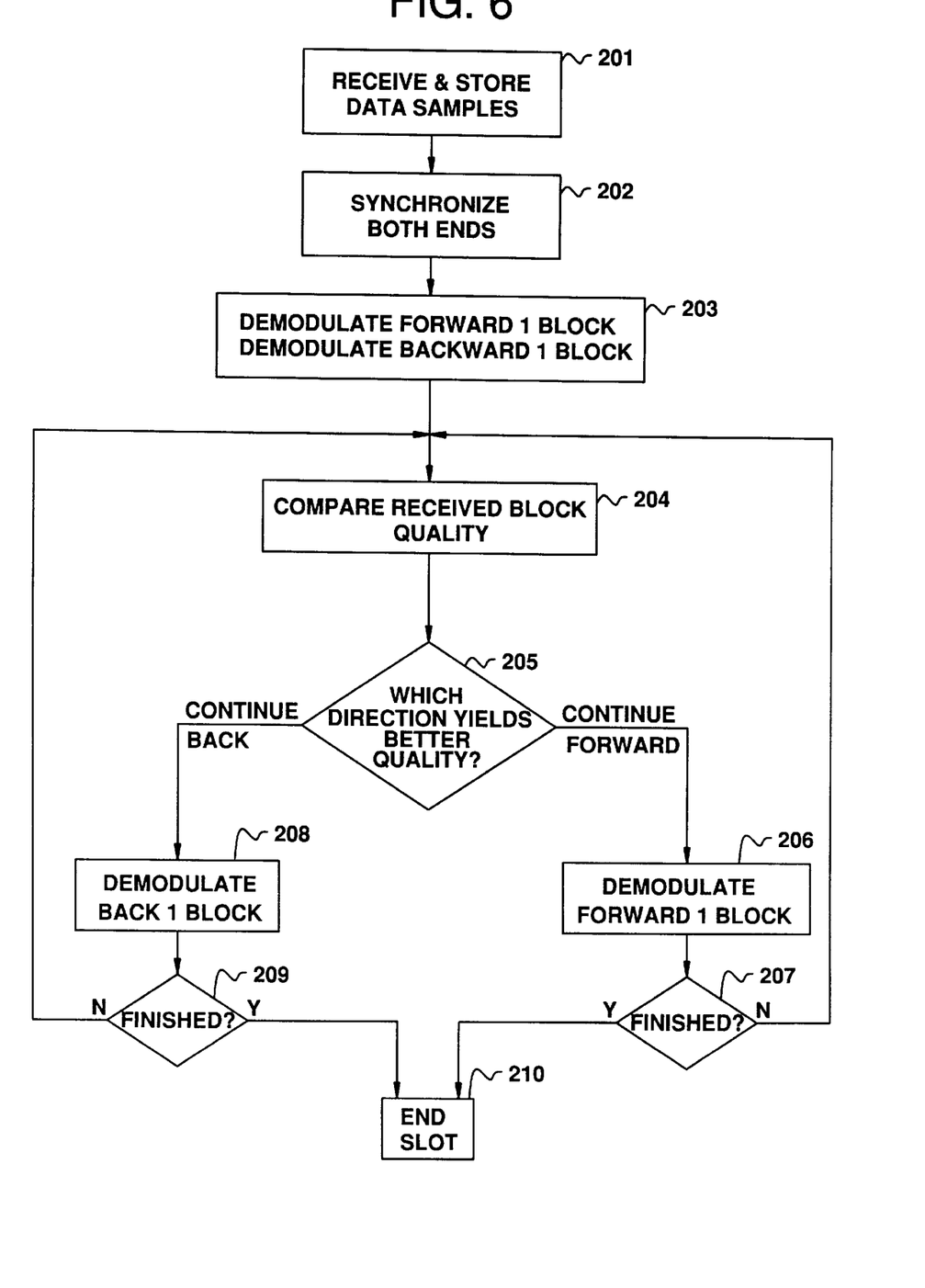
FIG. 6 is a flow chart illustrating the method and system of the present invention.

Referring next to FIG. 6, there is shown a flow chart illustrating certain aspects of the method and system of the present invention. At 201 the system receives and stores data samples and at 202 synchronizes both ends of the received data to be demodulated. At 203 the system demodulates forward one block and demodulates backward one block. The results of the demodulations in the two opposed directions are compared at 204 to determine which produced the higher quality result. At 205 the system inquires as to which direction yields the better quality output and if it is the forward direction demodulation is continued in the forward direction at 206 for one additional block. After that block is demodulated the system evaluates at 207 whether or not the data sample has been completely demodulated and, if not, the system returns to 204 to compare the quality of the most recently forward and backward demodulated blocks. If, however, at 205, demodulation in the backward direction is determined to yield the better quality, the system continues at 208 to demodulate in the backward direction and evaluates at 209 whether or not the system has completely demodulated the entire signal sample. If not, the system returns to 204 to compare the quality of the most recently forward and backward demodulated blocks. When the entire signal sample unit has been demodulated, the system ends at 210.

It will be appreciated that the above-described methods may be used with simpler demodulators than the multi-state Viterbi equalizer. For example, a symbol-by-symbol demodulator that also generates path metrics may be constructed by simplifying a Viterbi demodulator to a single state. Such simplified Viterbi demodulator compares each received signal sample with reference signal values corresponding to all values a data symbol can have, decides which reference value (and therefore which data symbol) the received signal most closely matches, and accumulates the residual mismatch as a cumulative quality measure or path metric.

It should also be noted that the demodulator need not even be a Viterbi equalizer. It could be another equalizer type other than Viterbi or any demodulator type. The quality information about the demodulation depends upon the detector type. For example, if the detector is a linear or decision feedback equalizer, then the quality may include the mean square error or filter coefficient values.

The foregoing methods may also be used either with differentially encoded modulations, minimum-shift keying ("MSK") 4-MSK, or DQPSK, in which data is encoded in the changes between signal samples, or with coherent modulations, such as PSK or QPSK, in which data is encoded in the absolute values of the signal samples. For differential modulations, forward and backward demodulated symbol sequences represent absolute signal values that can be decoded differentially by comparing neighboring values to determine the changes, and thus the transmitted data.

Figure 2B:
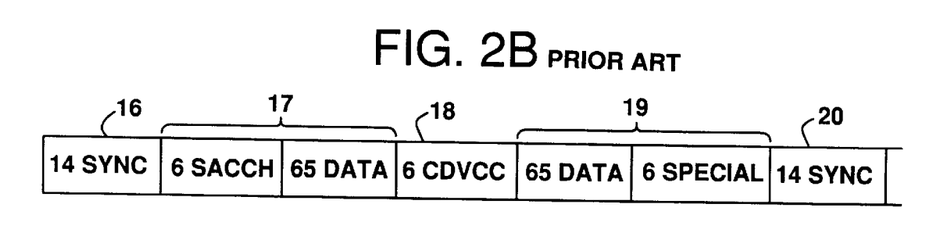
FIG. 2B shows the format of a portion of a signal transmitted in a digital cellular radio telephone system.

An important application of the present invention is in receiving $\pi/4$-DQPSK signals transmitted by a cellular radio telephone base station conforming to the CTIA standard IS-136. The format of the transmitted data is shown in FIG. 2B. A group 16 of fourteen predetermined symbols for synchronization, or training, precedes a group 17 of unknown quaternary data symbols that each bear two bits of data. The group 17 comprises two subgroups of six and sixty-five symbols, and precedes another group 18 of six predetermined symbols that is usually called CDVCC. The groups 16–18 are followed by another group 19 of unknown quaternary data symbols that each bear two bits of data and another group 20 of fourteen predetermined symbols. The group 19 comprises two subgroups of sixty-five and six symbols. It will be noted that this format is symmetrical when viewed in the forward and backward time directions. The system of the present invention performs forward demodulation of the symbol group 17 using the group 16 of predetermined symbols, and backward demodulation of the group 17 using the known six-symbol CDVCC 18. Partial path metric value comparison and symbol selection process is performed separately for data symbol groups 17 and 19.

Alternatively, data symbol groups 17, 18, and 19 can be treated as unknown, so that forward demodulation proceeds from data symbol group 16 and backward demodulation proceeds from data symbol group 20.

Some operational details of the demodulators 154 and 155 are due to the differential decoding of the $\pi/4$-DQPSK which is handled as follows. When one of the four states is evaluated as a possible predecessor to a new state, the differential symbol represented by the postulated state transition is calculated. For example, the transition from predecessor state 00 to successor state 00 implies a differential symbol 00 (since 00+00=00 mod 2), the transition from 11 to 10 implies a differential symbol 01 since 11+01=10 mod 2), and so on. Soft information is generated for the two constituent bits of the differential symbol as the difference between the surviving path metrics and the path metric for the transition with each bit of implied differential symbol inverted in turn, and the differences, accorded the signs of the differential symbol bit-pair, are entered into the symbol history. The soft values may be used subsequently in an error-correction decoding process, such as a soft-decision, Viterbi convolutional decoder.

The present invention is not limited to TDMA systems. It can also be used in FDMA, CDMA and hybrid systems. For example, the present invention can be applied to a direct-sequence CDMA system, using spread-spectrum modulation, in which-there are pilot symbols. The pilot symbols correspond to the known symbols. Demodulation may be performed by a correlator receiver. If necessary, multiple correlations followed by Rake combining may be performed. Quality information can be represented by the amplitude of the output of the Rake combiner. Channel tap coefficient estimates can also be used.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A method of bidirectionally demodulating data symbols transmitted through a communication channel comprising the steps of:

sequentially receiving a first plurality of known data symbols, a second plurality of unknown data symbols, and a third plurality of known data symbols;

storing the first plurality of known data symbols, the second plurality of unknown data symbols and the third plurality of known data symbols;

forward-demodulating a first block of the second plurality of unknown data symbols received nearer said first plurality of known data symbols;

backward-demodulating a second block of the second plurality of unknown data symbols received nearer said third plurality of known data symbols;

determining quality values indicative of demodulation qualities in the forward-demodulated first block and the backward-demodulated second block of the unknown data symbols, said quality values including a plurality of figure-of-merits each based on at least one of noise power, signal power and a combination of signal power plus noise power;

comparing the quality values to produce a best direction indication; and repeating either the step of forward-demodulating or the step of backward-demodulating depending upon the best direction indication determined in the step of comparing for subsequent blocks of unknown data symbols.

2. The method as set forth in claim 1, wherein said step of determining quality values further includes one of said plurality of figure-of-merits based upon a cost function approach including at least one of synchronous quality information and fade depth information.

3. The method as set forth in claim 1, wherein said step of determining quality values further includes one of said plurality of figure-of-merits based upon at least one of a ratio of signal power to noise power, a ratio of signal power plus noise power to noise power, and channel gain.

4. The method as set forth in claim 1, wherein said step of comparing further includes implementing a forward control algorithm and a backward control algorithm.

5. The method as set forth in claim 4, wherein said step of implementing the forward control algorithm further includes the steps of:

multiplying said combination of signal power plus noise power determined in the forward-demodulated first block to the noise power determined in the backward-demodulated second block to determine a first product;

multiplying said combination of signal power plus noise power determined in the backward-demodulated second block to the noise power determined in the forward-demodulated first block to determine a second product; and subtracting the second product from the first product.

6. The method as set forth in claim 4, wherein said step of implementing the backward control algorithm further includes the steps of:

multiplying said combination of signal power plus noise power determined in the backward-demodulated second block to the noise power determined in the forward-demodulated first block to determine a first product;

multiplying said combination of signal power plus noise power determined in the forward-demodulated first block to the noise power determined in the backward-demodulated second block to determine a second product; and subtracting the second product from the first product.

7. The method as set forth in claim 1, wherein said step of comparing further includes implementing a logical control algorithm including the steps of:

dividing said combination of signal power plus noise power determined in the forward-demodulated first block into the noise power determined in the forward-demodulated first block to determine a first value;

dividing said combination of signal power plus noise power determined in the backward-demodulated second block into the noise power determined in the backward-demodulated second block to determine a second value; and determining if said first value is greater than said second value.

8. A system for bidirectionally demodulating data symbols transmitted through a communication channel comprising:

means for sequentially receiving a first plurality of known data symbols, a second plurality of unknown data symbols, and a third plurality of known data symbols;

means for storing the first plurality of known data symbols, the second plurality of unknown data symbols and the third plurality of known data symbols;

means for forward-demodulating a first block of the second plurality of unknown data symbols received nearer said first plurality of known data symbols;

means for backward-demodulating a second block of the second plurality of unknown data symbols received nearer said third plurality of known data symbols;

means for determining quality values indicative of demodulation qualities in the forward-demodulated first block and the backward-demodulated second block of the unknown data symbols, said quality values including a plurality of figure-of-merits each based upon at least one of noise power, signal power, and a combination of signal power plus noise power;

means for comparing the quality values to produce a best direction indication; and means for selecting either the means for forward-demodulating or the means for backward-demodulating to demodulate subsequent blocks of unknown data symbols based on the comparison of the quality values.

9. The system as set forth in claim 8 wherein said means for determining quality values further includes one of said plurality of figure-of-merits based upon a cost function approach including at least one of synchronous quality information and fade depth information.

10. The system as set forth in claim 8, wherein said means for determining quality values further includes one of said plurality of figure-of-merits based upon at least one of a ratio of signal power to noise power, a ratio of signal power plus noise power to noise power, and channel gain.

11. The system as set forth in claim 8, wherein said means for comparing further includes means for implementing a forward control algorithm and a backward control algorithm.

12. The system as set forth in claim 11, wherein said forward control algorithm is operable to multiply said combination of signal power plus noise power determined in the forward-demodulated first block to the noise power determined in the backward-demodulated second block to determine a first product, and multiply said combination of signal power plus noise power determined in the backward-demodulated second block to the noise power determined in the forward-demodulated first block to determine a second product, and then subtract the second product from the first product.

13. The system as set forth in claim 11, wherein said backward control algorithm is operable to multiply said combination of signal power plus noise power determined in the backward-demodulated second block to the noise power determined in the forward-demodulated first block to determine a first product, and multiply said combination of signal power plus noise power determined in the forward-demodulated first block to the noise power determined in the backward-demodulated second block to determine a second product, and then subtract the second product from the first product.

14. The system as set forth in claim 8, wherein said means for comparing further including means for implementing a logical control algorithm operable to divide said combination of signal power plus noise power determined in the forward-demodulated first block into the noise power determined in the forward-demodulated first block to determine a first value, and divide said combination of signal power plus noise power determined in the backward-demodulated second block into the noise power determined in the backward-demodulated second block to determine a second value, and then determine if said first value is greater than said second value.

* * * * *

UNITED STATES PATENT AND TRADEMARK OFFICE
CERTIFICATE OF CORRECTION

PATENT NO. : 5,909,465
DATED : Jun. 1, 1999
INVENTOR(S) : Bottomley et al.

It is certified that error appears in the above-identified patent and that said Letters Patent is hereby corrected as shown below:

| | |
|---|---|
| Column 1, line 18 | Replace "communicates."<br>With --communicate.-- |
| Column 1, line 20 | Replace "the"<br>With --a-- |
| Column 2, line 52 | Replace "$C_j$"<br>With --$C_j,$-- |
| Column 5, line 14 | Replace "demodulated she"<br>With --accuracy of the-- |
| Column 6, line 32 | Replace "inventions;"<br>With --invention;-- |
| Column 11, line 61 | Replace "which-there"<br>With --which there-- |

Signed and Sealed this

Fourth Day of January, 2000

Attest:

*Attesting Officer*    *Acting Commissioner of Patents and Trademarks*